(12) United States Patent
Xiao

(10) Patent No.: US 10,746,915 B2
(45) Date of Patent: Aug. 18, 2020

(54) LIGHT GUIDE PLATE, BACKLIGHT MODULE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Lichuan Xiao, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/287,890

(22) Filed: Feb. 27, 2019

(65) Prior Publication Data

US 2019/0278016 A1  Sep. 12, 2019

(30) Foreign Application Priority Data

Mar. 12, 2018 (CN) .................... 2018 2 0333763 U

(51) Int. Cl.
*G02B 6/00* (2006.01)
*F21V 8/00* (2006.01)

(52) U.S. Cl.
CPC .......... *G02B 6/0061* (2013.01); *G02B 6/002* (2013.01); *G02B 6/0068* (2013.01); *G02B 6/0073* (2013.01)

(58) Field of Classification Search
CPC .. G02B 6/0001; G02B 6/0013; G02B 6/0023; G02B 6/0026; G02B 6/003; G02B 6/002; G02B 6/0021; G02B 6/0045; G02B 6/0073; G02B 6/0061

See application file for complete search history.

(56) References Cited

U.S. PATENT DOCUMENTS

| | | | | |
|---|---|---|---|---|
| 2006/0285356 A1* | 12/2006 | Tseng | ............... | G02B 6/0016 362/608 |
| 2012/0206935 A1* | 8/2012 | Seo | ............... | G02B 6/0023 362/602 |
| 2015/0168631 A1* | 6/2015 | Umekawa | ............ | G02B 6/0016 362/613 |
| 2017/0276316 A1* | 9/2017 | Kawabata | ............ | F21S 43/243 |

* cited by examiner

*Primary Examiner* — Y M. Quach Lee
(74) *Attorney, Agent, or Firm* — McDermott Will & Emery LLP

(57) ABSTRACT

A backlight module includes a light guide plate and a plurality of light-emitting units. The plurality of light-emitting units emit light toward a light incident surface of the light guide plate. The plurality of light-emitting units are attached to the light incident surface of the light guide plate and arranged along a target direction in manner of spacing between two adjacent light-emitting units. A plurality of light-converging portions are arranged along the target direction in an end portion of the light guide plate where the light incident surface is located, and the plurality of light-converging portions are disposed at locations of the light guide each of which is corresponding to the spacing. The plurality of light-converging portions are configured to converge light incident into the light-converging portions through the light incident surface.

13 Claims, 5 Drawing Sheets

LIGHT GUIDE PLATE, BACKLIGHT MODULE AND DISPLAY DEVICE

CROSS-REFERENCE TO RELATED APPLICATIONS

This application claims priority to Chinese Patent Application No. 201820333763.1, filed on Mar. 12, 2018, titled "A LIGHT GUIDE PLATE, BACKLIGHT MODULE AND DISPLAY DEVICE", which is incorporated herein by reference in its entirety.

TECHNICAL FIELD

The present disclosure relates to the field of display technologies, in particular, to a light guide plate, a backlight module and a display device.

BACKGROUND

As an important component of liquid crystal display devices, backlight modules are used for providing light sources for display panels in the liquid crystal display devices. Since a light-emitting effect of the backlight module directly affects a display quality of the liquid crystal display device, it has always been the goal to obtain a backlight module capable of providing a uniform and bright light source.

SUMMARY

In a first aspect, some embodiments of the present disclosure provide a backlight module. The backlight module includes a light guide plate and a plurality of light-emitting units. The plurality of light-emitting units emit light toward a light incident surface of the light guide plate. The plurality of light-emitting units are attached to the light incident surface of the light guide plate and arranged along a target direction in manner of spacing between two adjacent light-emitting units. A plurality of light-converging portions are arranged along the target direction in an end portion of the light guide plate where the light incident surface is located; the plurality of light-converging portions are disposed at locations of the light guide each of which is corresponding to the spacing. The plurality of light-converging portions are configured to converge light incident into the light-converging portions through the light incident surface. The target direction is an extending direction of an edge of a light emitting surface of the light guide plate which is in connection with the light incident surface.

In some embodiments, the plurality of light-emitting units have a determinate light-emitting range respectively, each of the plurality of light-converging portions is disposed at an area which is outside of respective light-emitting ranges of two adjacent light-emitting units.

In some embodiments, each of the plurality of light-converging portion includes a first light-converging cavity that is hollow, and the first light-converging cavity comprises at least one light-converging cavity unit; in the target direction, a width of a middle region of the at least one light-converging cavity unit is less than a width of an edge region of the at least one light-converging cavity unit.

In some embodiments, the first light-converging cavity includes a single light-converging cavity unit of the at least one light-converging cavity unit; in a direction perpendicular to the light incident surface, the first light-converging cavity comprises a first surface and a second surface that are opposite to each other; the first surface is a concave curved surface, and the second surface is a flat surface, a concave curved surface or a convex curved surface.

In some embodiments, in a case where the second surface is a convex curved surface, a degree of concavity of the concave curved surface is greater than a degree of convexity of the convex curved surface.

In some embodiments, the first light-converging cavity includes at least two light-converging cavity units of the at least one light-converging cavity units; in a direction perpendicular to the light incident surface, each of the at least two light-converging cavity units comprises a third surface and a fourth surface that are opposite to each other; the third surface is a concave curved surface, and the fourth surface is a flat surface; alternatively, the fourth surface is symmetrical with the third surface relative to a central surface of the first light-converging cavity, and the central surface is parallel to the light incident surface; wherein two adjacent light-converging cavity units of the at least two light-converging cavity units are directly connected; alternatively, the two adjacent light-converging cavity units are connected by a rectangular cavity unit.

In some embodiments, each of the plurality of light-converging portion includes a second light-converging cavity and a filling portion located in the second light-converging cavity; and in the target direction, a width of a middle region of the second light-converging cavity is greater than a width of an edge region of the second light-converging cavity; wherein a refractive index of a material constituting the filling portion is greater than a refractive index of a material constituting the light guide plate.

In some embodiments, in a direction perpendicular to the light incident surface, the second light-converging cavity includes a fifth surface and a sixth surface that are opposite to each other; the fifth surface is a convex curved surface, and the sixth surface is a flat surface, a convex curved surface or a concave curved surface.

In some embodiments, in a case where the sixth surface is a concave curved surface, a degree of convexity of the convex curved surface is greater than a degree of concavity of the concave curved surface In some embodiments, the plurality of light-emitting units are light-emitting diodes.

In a second aspect, some embodiments of the present disclosure provide a light guide plate used for the backlight module as described above. An end portion of the light guide plate where a light incident surface thereof is located has a plurality of light-converging portions that are spaced apart along the target direction. The light guide plate is configured to attach to the plurality of the light-emitting units in the backlight module in such a manner that the plurality of light-converging portions each correspond to the spacing between two adjacent light-emitting units.

In a third aspect, some embodiments of the present disclosure provide a display device, which includes the backlight module according to the second aspect.

BRIEF DESCRIPTION OF THE DRAWINGS

The accompanying drawings are used to provide further understanding of the present disclosure and constitute a part of the present disclosure. The exemplary embodiments in the present disclosure and the descriptions thereof serve to explain the present disclosure, but do not constitute a limitation to the present disclosure. In the accompanying drawings.

DETAILED DESCRIPTION

The technical solutions in embodiments of the present disclosure will be described clearly and completely in conjunction with the accompanying drawings in embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Backlight modules usually include a light guide plate and a plurality of light-emitting diodes (LEDs) that are disposed on one side of the light guide plate. Light emitted by the plurality of LEDs are guided by the light guide plate to form a surface light source. In areas within light-emitting ranges of the LEDs, intensity of light exiting the light guide plate is high, and thus these areas of the backlight module appear bright. However, in areas outside the light-emitting ranges of the LEDs, due to a low intensity of light exiting the light guide plate, these areas of the backlight module appear dim. For the above reasons, a dim area may be easily formed in a region between two LEDs in a light incident end of the light guide plate, which will cause hot spots (very bright areas that make other areas look dim) and seriously affect a display quality of a liquid crystal display device. Furthermore, in order to reduce power consumption of the backlight module and lower cost, a number of the LEDs in the backlight module is reduced. As a result, a distance between two adjacent LEDs is increased, which makes it even easier for dim areas to be formed in the light incident end of the light guide plate. In order to solve this dim area problem, one method commonly used in the related art is to improve the design of optical dots at the light incident end of the light guide plate. A term "dots" refers to protuberances that are on two surfaces of the light guide plate which are in a thickness direction of the light guide plate. Therefore, the light guide plate has a plurality of protuberances, i.e., a plurality of dots. The plurality of dots may enable light that is incident into the dots to generate diffuse reflection, thereby homogenizing the light. However, since a size and density of the optical dots are not easy to control, it is necessary to repeatedly modify design parameters of the optical dots for each time of production to remove the dim areas. This operation is very complicated.

Figure 1A:
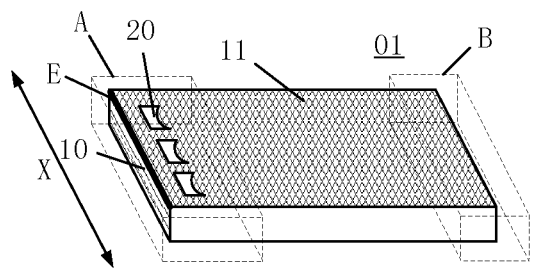
FIG. 1a is a schematic diagram showing a structure of a light guide plate according to some embodiments of the present disclosure.
Figure 1B:
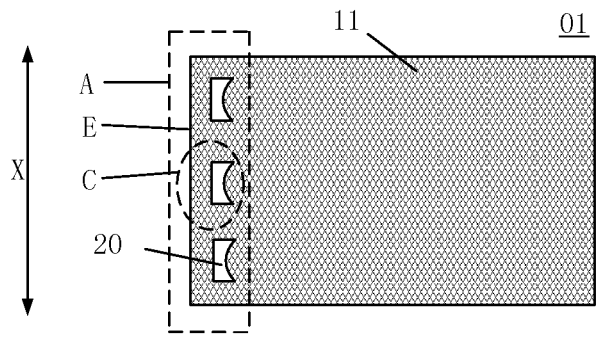
FIG. 1b is a plan view of the light guide plate according to some embodiments shown in FIG. 1.
Figure 2:
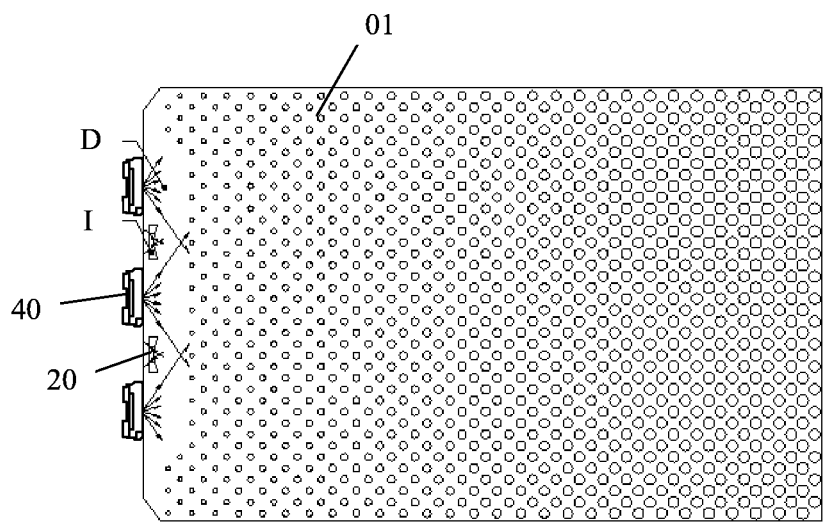
FIG. 2 is a schematic diagram showing a structure of a backlight module according to some embodiments of the present disclosure.

Some embodiments of the present disclosure provide a backlight module. As shown in FIG. 2, the backlight module includes a light guide plate 01 and a plurality of light-emitting units 40 that emit light toward a light incident surface of the light guide plate 01. The plurality of light-emitting units 40 are attached to the light incident surface of the light guide plate. The plurality of light-emitting units 40 are arranged along a target direction in manner of spacing between two adjacent light-emitting units, and each light-emitting unit 40 has a light-emitting angle. As shown in FIGS. 1a and 1b, a plurality of light-converging portions 20 are arranged along the target direction in an end portion A of the light guide plate 01 where the light incident surface 10 is located; the plurality of light-converging portions 20 are disposed in locations I (also referring to as areas I), i.e., dim areas, of the light guide plate each of which is corresponding to the spacing between two adjacent light-emitting units 40. The light-converging portions 20 are used for converging light incident into the light-converging portions 20 through the light incident surface 10. A term "light-emitting angle" refers to a angle at which most of the light emitted by the light-emitting unit is distributed, and is one of basic parameters of the light-emitting unit. Generally, for example, a light-emitting angle of an LED lamp is described in a product specification thereof.

The target direction is an extending direction of an edge E of a light emitting surface 11 of the light guide plate 01 that is in connection with the light incident surface 10 (i.e., direction X in FIG. 1a or 1b). A term "light emitting surface" refers to a surface of the light guide plate which is provided with the light-converging portions 20.

It will be noted that the above statement that "the plurality of light-converging portions 20 are disposed in areas I of the light guide plate each of which is corresponding to the spacing between two adjacent light-emitting units 40" may be interpreted as follows: the light guide plate 01 has a plurality of areas I, and the plurality of the light-converging portions 20 are disposed in some of the plurality of areas I, i.e., the plurality of areas I also have some areas in which the light-converging portions 20 are not disposed. The statement may also be interpreted as follows: each of the plurality of areas I has at least one light-converging portion 20. In some embodiments, as shown in FIG. 2, the statement that "the plurality of light-converging portions 20 are disposed in areas I of the light guide plate each of which is corresponding to the spacing between two adjacent light-emitting units 40" is interpreted as follows: the number of the light-converging portions 20 is equal to the number of the areas I, the plurality of light-converging portions 20 are in one-to-one correspondence with the plurality of areas I, and each light-converging portion 20 is disposed in an area I corresponding to the light-converging portion 20.

It will be noted that, as shown in FIG. 1a, in a direction perpendicular to the light incident surface 10, the light guide plate 01 has an end portion A and an end portion B, and the light-converging portions 20 are located in the end portion A where the light incident surface 10 is located. This embodiment does not limit a structure of the light-converging portions 20, as long as the light-converging portions 20 can converge the light incident into the light-converging portions 20 through the light incident surface 10. The structure of the light-converging portions 20 in FIGS. 1a and 1b is only an example, and is not intended to limit the structure of the light-converging portion 20.

Embodiments of the present disclosure provide backlight module that includes a light guide plate 01 and a plurality of light-emitting units 40. The backlight module includes the plurality of light-emitting units 40 that emit light toward the light incident surface of the light guide plate 01. And the plurality of light-emitting units 40 are sequentially arranged along the target direction. A plurality of light-converging portions 20 are arranged in the end portion A of the light guide plate 01 where the light incident surface 10 is located; the plurality of light-converging portions 20 are disposed in locations of the light guide plate each of which is corresponding to the spacing, i.e., area I between two adjacent light-emitting units 40. The light-converging portions 20 are used for converging the light incident into the light-converging portions 20 through the light incident surface 10. In this way, the light-converging portions 20 may converge a part of the light to the area I (that is, the above-mentioned dim area). Thus, it is unnecessary to repeatedly modify the design parameters of the optical dots of the light guide plate 01 to enhance brightness of the dim areas and remove the dim areas. Therefore, the operation becomes less complicated.

In some embodiments, as shown in FIG. 2, the plurality of light-emitting units 40 have a determinate light-emitting range respectively, each of the plurality of light-converging portions is disposed at an area which is outside of respective light-emitting ranges of two adjacent light-emitting units. An area D is an area within a light emitting range of the light-emitting unit 40, and the area I is an area outside of respective light-emitting ranges of two adjacent light-emitting units 40. As such, the plurality of the light-converging portions may converge a part of the light to the areas I each of which is outside of respective light-emitting ranges of two adjacent light-emitting units 40 in the backlight module, and thereby further enhancing brightness of the dim areas and remove the dim areas.

Figure 3:
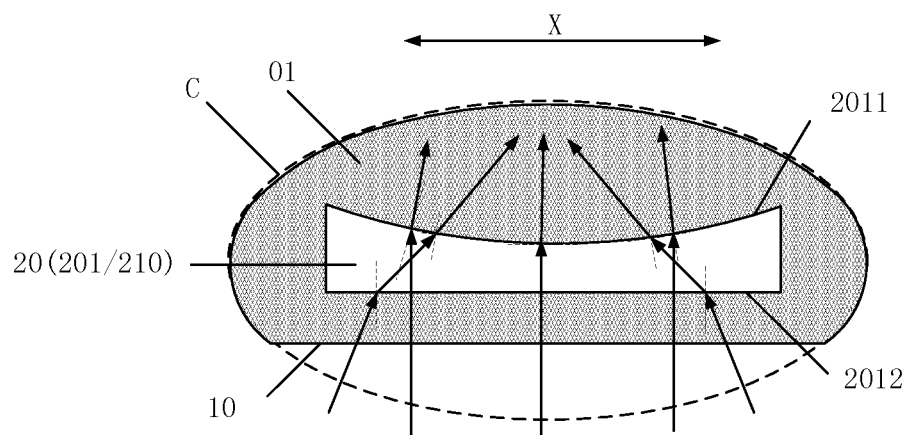
FIG. 3 is an enlarged view of region C of the light guide plate according to some embodiments shown in FIG. 1b.

In some embodiments, as shown in FIG. 3, the light-converging portion 20 includes a first light-converging cavity 201 that is hollow, and the first light-converging cavity 201 includes a single light-converging cavity unit 210. In the target direction, a width of a middle region of the light-converging cavity unit 210 (i.e., the first light-converging cavity 201) is less than a width of an edge region of the light-converging cavity unit 210. Since the width of the middle region of the light-converging cavity unit 210 is less than the width of the edge region of the first light-converging cavity 201, a shape of the first light-converging cavity 201 is similar to a shape of a concave lens; moreover, since the first light-converging cavity 201 is hollow, i.e., a medium in the first light-converging cavity 201 is air, the first light-converging cavity 201 is equivalent to an "air concave lens". As shown in FIG. 3, in this embodiment, the "air concave lens" is disposed in the light guide plate 01. It is known to those skilled in the art that the light guide plate 01 is an optically denser medium as compared with the air, and the air is an optically rarer medium. The light is incident into the air from the light guide plate 01, and is then incident into the light guide plate 01 from the air. According to a light-converging principle of the "air concave lens", the light will be converged after two refractions. In this way, the first light-converging cavity 201 may be able to converge the light incident into the first light-converging cavity 201.

Figure 4:
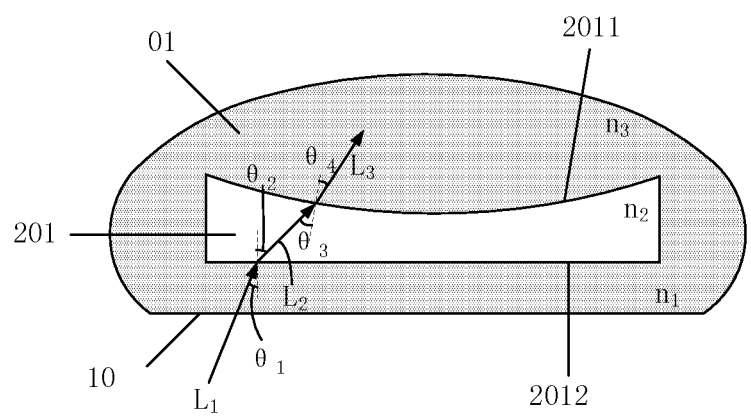
FIG. 4 is a schematic diagram of a light-converging principle of a light-converging portion in the light guide plate according to some embodiments shown in FIG. 3.

It is known to those skilled in the art that depending on shapes of a light incident surface and a light emitting surface, the "air concave lens" may be classified into "air plano-concave lens", "air biconcave lens" and "air meniscus lens". The above three types of "air concave lenses" are all able to converge the light incident into the first light-converging cavity 201. Hereinafter, the light-converging principle of the "air concave lens" will be described by taking the "air plano-concave lens" as an example. As shown in FIG. 4, the light L1 is incident into the first light-converging cavity 201 (i.e., the air) from the light guide plate 01; an angle of incidence is $\theta_1$, and an angle of refraction is $\theta_2$. The refracted light L2 is incident into the light guide plate 01 from the air; an angle of incidence is $\theta_3$, and an angle of refraction is $\theta_4$; and then the light L3 is obtained after two refractions. According to the refraction law $n_1 \times \sin \theta_1 = n_2 \times \sin \theta_2$, wherein $n_1$ represents a refractive index of the light guide plate 01, and $n_2$ represents a refractive index of the air, it may be known that $\theta_2 > \theta_1$ and $\theta_3 > \theta_4$. According to FIG. 4, $\theta_2 > \theta_3$, and then $\theta_2 > \theta_4$. Therefore, since the angle of refraction $\theta_2$ of the light incident on a light incident surface of the first light-converging cavity 201 is greater than the angle of refraction $\theta_4$ of light exiting a light emitting surface of the first light-converging cavity 201, the light L3 converges toward a central region of the first light-converging cavity 201 relative to the light L1.

In order to make the width of the middle region of the first light-converging cavity 201 less than the width of the edge region of the first light-converging cavity 201, in some embodiments, it is arranged that in a direction perpendicular to the light incident surface 10, the first light-converging cavity 201 includes a first surface 2011 and a second surface 2012 that are opposite to each other, wherein the first surface 2011 is a concave curved surface, and the second surface 2012 is a flat surface, a concave curved surface or a convex curved surface. This embodiment does not limit a positional relationship between the first surface 2011 and the second surface 2012 in the direction perpendicular to the light incident surface 10. That is, the first surface 2011 may be the light emitting surface of the first light-converging cavity 201 and the second surface 2012 may be the light incident surface of the first light-converging cavity 201; alternatively, the second surface 2012 may be the light emitting surface of the first light-converging cavity 201, and the first surface 2011 may be the light incident surface of the first light-converging cavity 201.

For example, as shown in FIG. 3, the first surface 2011 is a concave curved surface, and the second surface 2012 is a flat surface. In this case, the shape of the first light-converging cavity 201 is similar to the shape of a plano-concave lens. At this time, the light-converging portion 20 is equivalent to an "air plano-concave lens", and is able to converge the light incident into the first light-converging cavity 201.

Figure 5:
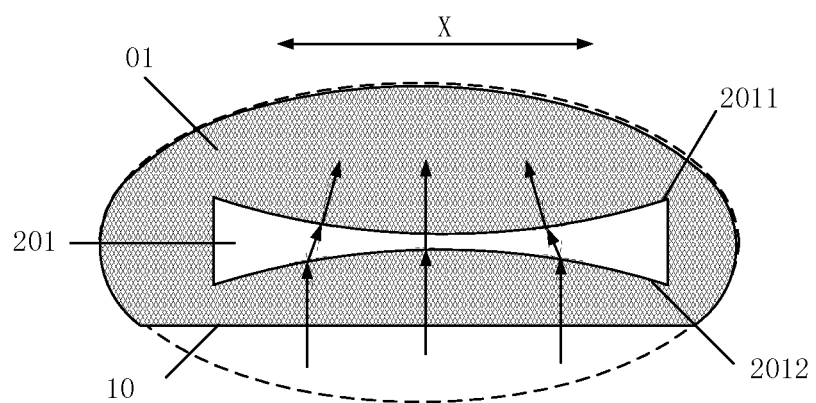
FIG. 5 is a schematic diagram showing a structure of a light-converging portion in the light guide plate according to some embodiments shown in FIG. 1 in a case where the light-converging portion includes a single light-converging cavity unit.

For another example, as shown in FIG. 5, the first surface 2011 is a concave curved surface, and the second surface 2012 is also a concave curved surface. In this case, the shape of the first light-converging cavity 201 is similar to the shape of a biconcave lens. At this time, the first light-converging cavity 201 is equivalent to an "air biconcave lens", and is able to converge the light incident into the first light-converging cavity 201, as shown in FIG. 5.

Figure 6:
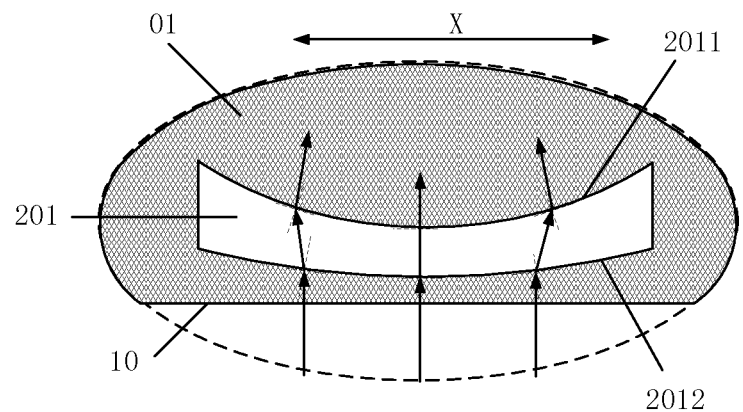
FIG. 6 is a schematic diagram showing another structure of the light-converging portion in the light guide plate according to some embodiments shown in FIG. 1 in a case where the light-converging portion includes a single light-converging cavity unit.

For yet another example, as shown in FIG. 6, the first surface 2011 is a concave curved surface, and the second surface 2012 is a convex curved surface. A degree of concavity of the concave curved surface is greater than a degree of convexity of the convex curved surface. In this case, the shape of the first light-converging cavity 201 is similar to the shape of a meniscus lens. At this time, the shape of the first light-converging cavity 201 is equivalent to the shape of an "air meniscus lens". As shown in FIG. 6, the first light-converging cavity 201 is able to converge the light incident into the first light-converging cavity 201.

It will be noted that in embodiments of the present disclosure, optionally, the concave curved surface may be a concave arc surface, and the convex curved surface may be a convex arc surface. Furthermore, in FIGS. 3, 5 and 6, two sides of the first light-converging cavity 201 arranged in the direction perpendicular to the light incident surface 10 indicate the first surface 2011 and the second surface 2012. This embodiment does not limit shapes of another two surfaces constituting the first light-converging cavity 201. For example, as shown in FIGS. 3, 5 and 6, the another two surfaces may both be flat surfaces, in which case another two sides of the first light-converging cavity 201 in a plan view thereof are straight lines.

Figure 7:
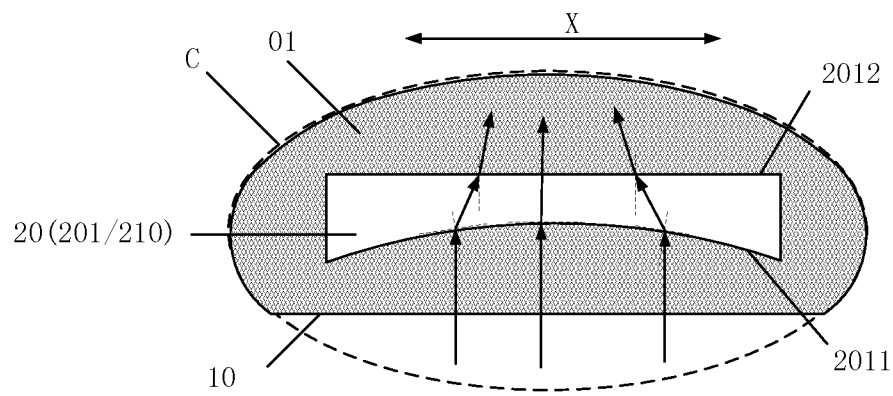
FIG. 7 is a schematic diagram showing yet another structure of the light-converging portion in the light guide plate according to some embodiments shown in FIG. 1 in a case where the light-converging portion includes a single light-converging cavity unit.

It is known to those skilled in the art that a direction in which light travels through a lens is reversible. Therefore, in FIGS. 3, 5 and 6, in a case where the first surface 2011 of the light-converging cavity unit 210 is used as a light incident surface, and the second surface 2012 of the light-converging cavity unit 210 is used as a light emitting surface, the first light-converging cavity 201 is also able to converge the light incident into the first light-converging cavity 201. Taking an example in which the first light-converging cavity 201 is in the shape of a plano-concave lens, for example, as shown in FIG. 7, the light emitting surface of the first light-converging cavity 201 is a flat surface, and the light incident surface of the first light-converging cavity 201 is a concave surface, the "air plano-concave lens" is still able to converge the light incident into the first light-converging cavity 201.

Figure 8:
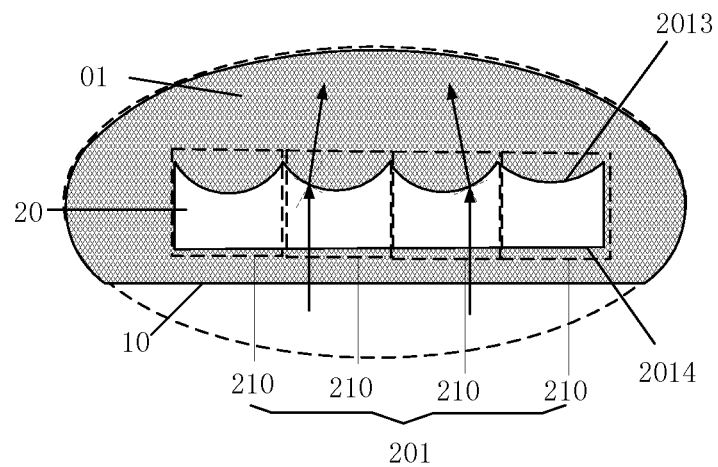
FIG. 8 is a schematic diagram showing a structure of the light-converging portion in the light guide plate according to some embodiments shown in FIG. 1 in a case where the light-converging portion includes a plurality of light-converging cavity units and adjacent light-converging cavity units are directly connected.

In some other embodiments, as shown in FIG. 8, the light-converging portion 20 includes a first light-converging cavity 201 that is hollow, the first light-converging cavity 201 includes at least two light-converging cavity units 210, and in the target direction, the width of the middle region of the light-converging cavity unit 210 is less than the width of the edge region of the light-converging cavity unit 210. In this way, each light-converging cavity unit 210 is equivalent to an "air concave lens". Thereby, the first light-converging cavity 201 constituted by the at least two light-converging cavity units 210 may be used to converge light.

Figure 9:
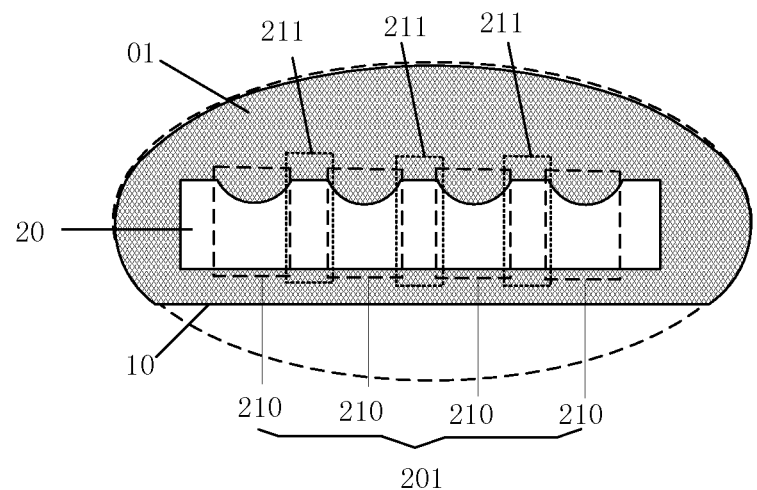
FIG. 9 is a schematic diagram showing a structure of the light-converging portion in the light guide plate according to some embodiments shown in FIG. 1 in a case where the light-converging portion includes a plurality of light-converging cavity units and adjacent light-converging cavity units are connected by a rectangular cavity unit.

In the above embodiment, the light-converging cavity units 210 may be directly connected, as shown in FIG. 8; alternatively, two adjacent light-converging cavity units 210 may be connected by a rectangular cavity unit 211, as shown in FIG. 9, which is not specifically limited herein. It will be noted that the rectangular cavity unit 211 is a cavity unit two surfaces of which arranged in a direction perpendicular to the light incident surface 10 are both flat surfaces.

In order to make the width of the middle region of the light-converging cavity unit 210 less than the width of the edge region of the light-converging cavity unit 210, in some embodiments, it is arranged that in the direction perpendicular to the light incident surface 10, each light-converging cavity unit 210 includes a third surface 2013 and a fourth surface 2014 that are opposite to each other. The third surface 2013 is a concave curved surface, and the fourth surface 2014 is a flat surface; alternatively, the fourth surface 2014 is symmetrical with the third surface 2013 relative to a central surface 30 of the first light-converging cavity 201, and the central surface 30 is parallel to the light incident surface 10. This embodiment does not limit a positional relationship between the third surface 2013 and the fourth surface 2014 in the direction perpendicular to the light incident surface 10. That is, the third surface 2013 may be the light emitting surface of the light-converging cavity unit 210, and the fourth surface 2014 may be the light incident surface of the light-converging cavity unit 210; alternatively, the fourth surface 2014 may be the light emitting surface of the light-converging cavity unit 210, and the third surface 2013 may be the light incident surface of the light-converging cavity unit 210.

For example, as shown in FIGS. 8 and 9, the third surface 2013 is a concave curved surface, and the fourth surface 2014 is a flat surface.

Figure 10:
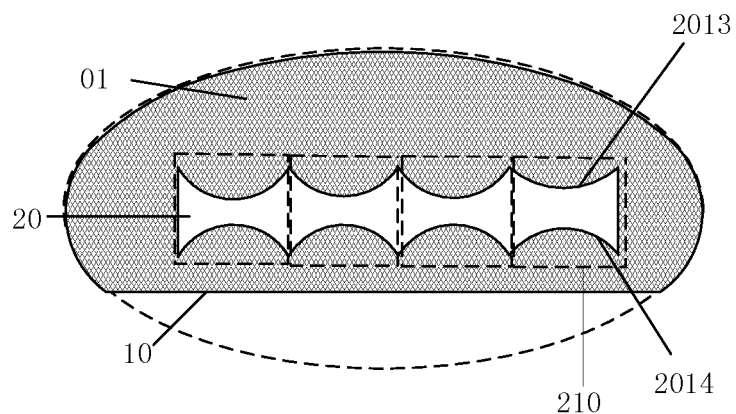
FIG. 10 is a schematic diagram showing another structure of the light-converging portion in the light guide plate according to some embodiments shown in FIG. 1 in a case where the light-converging portion includes a plurality of light-converging cavity units and adjacent light-converging cavity units are directly connected.
Figure 11:
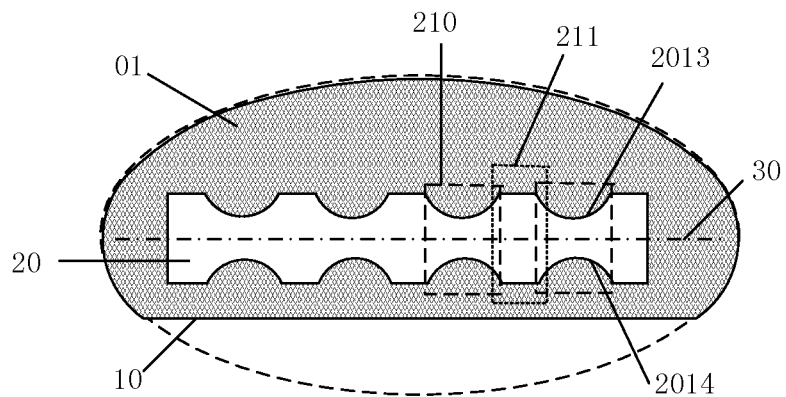
FIG. 11 is a schematic diagram showing another structure of the light-converging portion in the light guide plate according to some embodiments shown in FIG. 1 in a case where the light-converging portion includes a plurality of light-converging cavity units and adjacent light-converging cavity units are connected by a rectangular cavity unit.

For another example, as shown in FIGS. 10 and 11, the third surface 2013 is a concave curved surface, the fourth surface 2014 is symmetrical with the third surface 2013 relative to the central surface 30 of the first light-converging cavity 201, and the central surface 30 is parallel to the light incident surface 10.

Figure 12:
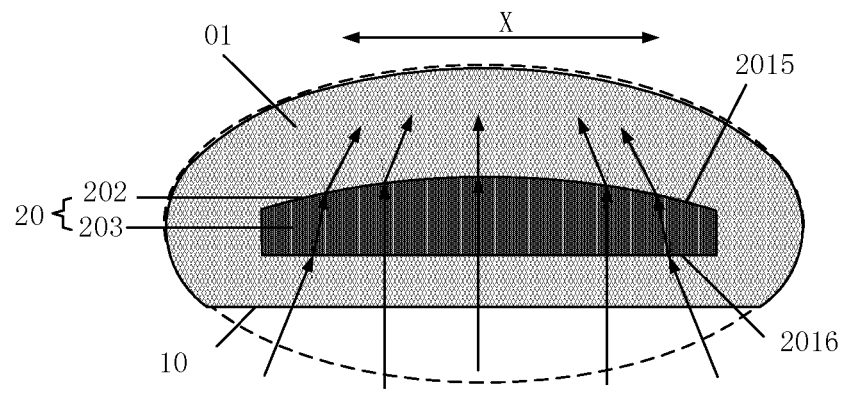
FIG. 12 is a schematic diagram showing a structure of the light-converging portion in the light guide plate according to some embodiments shown in FIG. 1 in a case where the light-converging portion includes a second light-converging cavity and a filling portion.

In some embodiments, as shown in FIG. 12, the light-converging portion 20 includes a second light-converging cavity 202 and a filling portion 203 located in the second light-converging cavity 202; and in the target direction, a width of a middle region of the second light-converging cavity 202 is greater than a width of an edge region of the second light-converging cavity 202. A refractive index of a material constituting the filling portion 203 is greater than a refractive index of a material constituting the light guide plate 01. Since the width of the middle region of the second light-converging cavity 202 is greater than the width of the edge region of the second light-converging cavity 202, a shape of the second light-converging cavity 202 is similar to a shape of a convex lens. Moreover, since a filling portion 203 is provided in the second light-converging cavity 202, and the refractive index of the material constituting the filling portion 203 is greater than the refractive index of the material constituting the light guide plate 01, the light-converging portion 20 is equivalent to a "convex lens". It is known to those skilled in the art that a convex lens can converge light incident into the convex lens, and thus it will not be described in this embodiment. As shown in FIG. 12, in this embodiment, the "convex lens" is disposed in the light guide plate 01; the filling portion 203 is an optically denser medium as compared with the light guide plate 01, and the light guide plate 01 is an optically rarer medium in this case. The light is incident into the filling portion 203 from the light guide plate 01, and is then incident into the light guide plate 01 from the filling portion 203. The light will be converged after two refractions. In this way, according to a light-converging principle of the "convex lens", the light-converging portion 20 may be able to converge the light incident into the second light-converging cavity 202.

In order to make the width of the middle region of the second light-converging cavity 202 greater than the width of the edge region of the second light-converging cavity 202, in some embodiments, as shown in FIG. 12, it is arranged that in the direction perpendicular to the light incident surface 10, the second light-converging cavity 202 includes a fifth surface 2015 and a sixth surface 2016 that are opposite to each other. The fifth surface 2015 is a convex curved surface, and the sixth surface 2016 is a flat surface, a convex curved surface or a concave curved surface. This embodiment does not limit a positional relationship between the fifth surface 2015 and the sixth surface 2016 in the direction perpendicular to the light incident surface 10. That is, the fifth surface 2015 may be the light emitting surface of the second light-converging cavity 202, and the sixth surface 2016 may be the light incident surface of the second light-converging cavity 202; alternatively, the sixth surface 2016 may be the light emitting surface of the second light-converging cavity 202, and the fifth surface 2015 may be the light incident surface of the second light-converging cavity 202. A description is given in embodiments of the present disclosure by only taking an example in which the fifth surface 2015 is the light emitting surface of the second light-converging cavity 202.

For example, as shown in FIG. 12, the fifth surface 2015 is a convex curved surface, and the sixth surface 2016 is a flat surface. In this way, the shape of the second light-converging cavity 202 is similar to a shape of a plano-convex lens. At this time, the light-converging portion 20 is equivalent to a plano-convex lens, which is able to converge the light incident into the second light-converging cavity 202.

Figure 13:
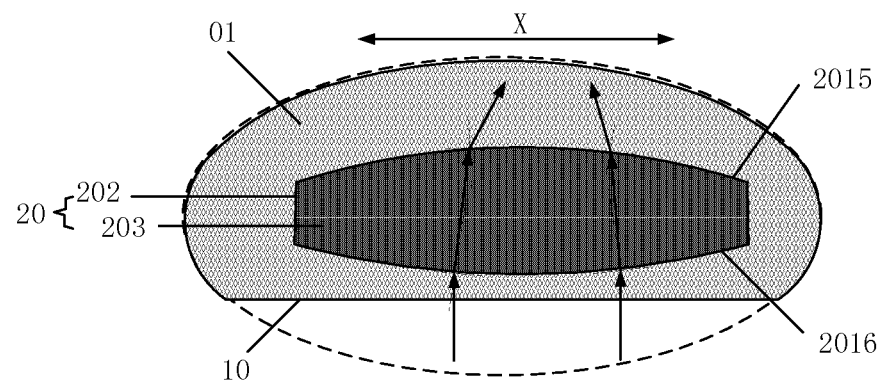
FIG. 13 is a schematic diagram showing another structure of the light-converging portion in the light guide plate according to some embodiments shown in FIG. 1 in a case where the light-converging portion includes a second light-converging cavity and a filling portion.

For another example, as shown in FIG. 13, the fifth surface 2015 is a convex curved surface, and the sixth surface 2016 is also a convex curved surface. In this way, the shape of the second light-converging cavity 202 is similar to a shape of a biconvex lens. At this time, the light-converging portion 20 is equivalent to a biconvex lens, which is able to converge the light incident into the second light-converging cavity 202.

Figure 14:
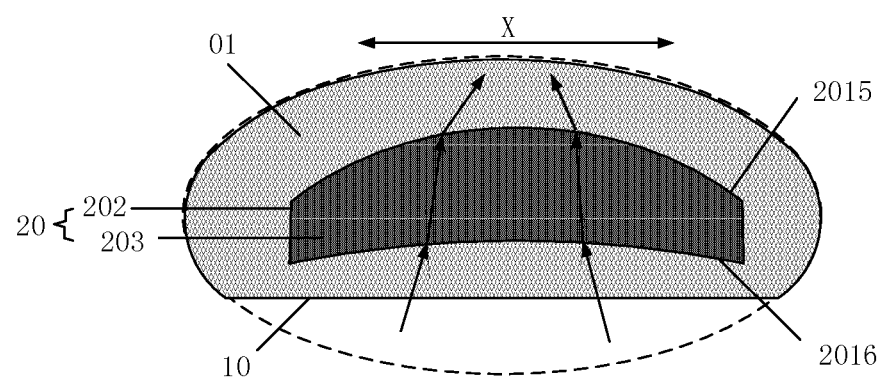
FIG. 14 is a schematic diagram showing yet another structure of the light-converging portion in the light guide plate according to some embodiments shown in FIG. 1 in a case where the light-converging portion includes a second light-converging cavity and a filling portion.

For yet another example, as shown in FIG. 14, the fifth surface 2015 is a convex curved surface, and the sixth surface 2016 is a concave curved surface. A degree of convexity of the convex curved surface is greater than a degree of concavity of the concave curved surface. In this way, the shape of the second light-converging cavity 202 is similar to the shape of a meniscus lens. At this time, the light-converging portion 20 is equivalent to a meniscus lens, which is able to converge the light incident into the second light-converging cavity 202.

It will be noted that in embodiments of the present disclosure, optionally, the concave curved surface may be a concave arc surface, and the convex curved surface may be a convex arc surface. Furthermore, in FIGS. 12, 13 and 14, two sides of the second light-converging cavity 202 arranged in the direction perpendicular to the light incident surface 10 indicate the fifth surface 2015 and the sixth surface 2016. This embodiment does not limit shapes of another two surfaces constituting the second light-converging cavity 202. For example, as shown in FIGS. 12, 13 and 14, the another two surfaces may both be flat surfaces, in which case another two sides in a plan view of the second light-converging cavity 202 are straight lines.

Since the direction in which light travels through a lens is reversible, in a case where the fifth surface 2015 of the second light-converging cavity 202 is used as a light incident surface, and the sixth surface 2016 of the second light-converging cavity 202 is used as a light emitting surface, the second light-converging cavity 202 is also able to converge the light incident into the second light-converging cavity 202.

The backlight module provided in embodiments of the present disclosure may also include a plastic frame. A part of light emitted by the light-emitting units 40 is incident on the plastic frame after an action of the optical dots in the light guide plate 01. The plastic frame will reflect the part of light to make the part of light re-enter the light guide plate 01.

Embodiments of the present disclosure do not limit a structure of the light-emitting units 40, as long as the light-emitting units 40 are able to emit light and the light is able to enter the light guide plate 01. Considering that the cost of LEDs is low and the manufacturing process of LEDs is mature, in some embodiments, the light-emitting units 40 may be LEDs.

Some embodiments of the present disclosure further provide a light guide plate, which is used for the backlight module as described above. An end portion of the light guide plate where the light incident surface is located has the plurality of light-converging portions spaced apart along the target direction. The light guide plate is configured to attach to the plurality of the light-emitting units in the backlight module in such a manner that the plurality of light-converging portions each correspond to the spacing between two adjacent light-emitting units. Exemplarily, the light guide plate of embodiments of the present disclosure may include the structure as described above.

Some embodiments of the present disclosure further provide a display device, which includes the backlight module as described above, and has a same structure and advantageous effects as the backlight module provided in the preceding embodiments. Since the structure and advantageous effects of the backlight module have been described in detail in the above embodiments, they will not be described herein again.

The display device provided in embodiments of the present disclosure may be any product or component having a display function, such as a mobile phone, a tablet computer, a TV set, a display, a laptop, a digital photo frame, and a navigator.

In the above description of the embodiments, specific features, structures, materials or characteristics may be combined in any suitable manner in any one or more embodiments or examples.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A backlight module comprising a light guide plate and a plurality of light-emitting units that emit light toward a light incident surface of the light guide plate, wherein the plurality of light-emitting units are attached to the light incident surface of the light guide plate and arranged along a target direction in manner of spacing between two adjacent light-emitting units;
    a plurality of light-converging portions are arranged along the target direction in an end portion of the light guide plate where the light incident surface is located; the plurality of light-converging portions are disposed at locations of the light guide each of which is corresponding to the spacing; the plurality of light-converging portions are configured to converge light incident into the light-converging portions through the light incident surface;
    the target direction is an extending direction of an edge of a light emitting surface of the light guide plate which is in connection with the light incident surface;
    wherein each of the plurality of light-converging portions comprises a light-converging cavity that is hollow, and the light-converging cavity comprises a light-converging cavity unit; in the target direction, a width of a middle region of the light-converging cavity unit is less than a width of an edge region of the light-converging cavity unit;
    wherein in a direction perpendicular to the light incident surface, the light-converging cavity comprises a first surface and a second surface that are opposite to each other; the first surface is a concave curved surface and the second surface is a convex curved surface; and a degree of concavity of the concave curved surface is greater than a degree of convexity of the convex curved surface.

2. The backlight module according to claim 1, wherein the plurality of light-emitting units have a determinate light-emitting range respectively, each of the plurality of light-converging portions is disposed at an area which is outside of respective light-emitting ranges of two adjacent light-emitting units.

3. The backlight module according to claim 1, wherein the plurality of light-emitting units are light-emitting diodes.

4. A light guide plate, wherein the light guide plate is the light guide plate in the backlight module according to claim 1.

5. A display device, comprising the backlight module according to claim 1.

6. A backlight module comprising a light guide plate and a plurality of light-emitting units that emit light toward a light incident surface of the light guide plate, wherein the plurality of light-emitting units are attached to the light incident surface of the light guide plate and arranged along a target direction in manner of spacing between two adjacent light-emitting units;
    a plurality of light-converging portions are arranged along the target direction in an end portion of the light guide plate where the light incident surface is located; the plurality of light-converging portions are disposed at locations of the light guide each of which is corresponding to the spacing; the plurality of light-converging portions are configured to converge light incident into the light-converging portions through the light incident surface;
    the target direction is an extending direction of an edge of a light emitting surface of the light guide plate which is in connection with the light incident surface;
    wherein each of the plurality of light-converging portions comprises a light-converging cavity that is hollow, and the light-converging cavity comprises at least two light-converging cavity units; in the target direction, a width of a middle region of the at least two light-converging cavity units is less than a width of an edge region of the at least two light-converging cavity units;
    in a direction perpendicular to the light incident surface, each of the at least two light-converging cavity units comprises a first surface and a second surface that are opposite to each other;
    the first surface is a concave curved surface, and the second surface is a flat surface;
    alternatively, the second surface is symmetrical with the first surface relative to a central surface of the light-converging cavity, and the central surface is parallel to the light incident surface;
    wherein two adjacent light-converging cavity units of the at least two light-converging cavity units are directly connected; alternatively, the two adjacent light-converging cavity units are connected by a rectangular cavity unit.

7. A light guide plate, wherein the light guide plate is the light guide plate in the backlight module according to claim 6.

8. A backlight module comprising a light guide plate and a plurality of light-emitting units that emit light toward a light incident surface of the light guide plate, wherein the plurality of light-emitting units are attached to the light incident surface of the light guide plate and arranged along a target direction in manner of spacing between two adjacent light-emitting units;
    a plurality of light-converging portions are arranged along the target direction in an end portion of the light guide plate where the light incident surface is located; the plurality of light-converging portions are disposed at locations of the light guide each of which is corresponding to the spacing; the plurality of light-converging portions are configured to converge light incident into the light-converging portions through the light incident surface;
    the target direction is an extending direction of an edge of a light emitting surface of the light guide plate which is in connection with the light incident surface;
    wherein each of the plurality of light-converging portions comprises a light-converging cavity and a filling portion located in the light-converging cavity; and in the target direction, a width of a middle region of the light-converging cavity is greater than a width of an edge region of the light-converging cavity;

wherein a refractive index of a material constituting the filling portion is greater than a refractive index of a material constituting the light guide plate.

9. The backlight module according to claim 8, wherein in a direction perpendicular to the light incident surface, the light-converging cavity includes a first surface and a second surface that are opposite to each other; the first surface is a convex curved surface, and the second surface is a flat surface, a convex curved surface or a concave curved surface.

10. The backlight module according to claim 9, wherein in a case where the second surface is a concave curved surface, a degree of convexity of the convex curved surface is greater than a degree of concavity of the concave curved surface.

11. A light guide plate, wherein the light guide plate is the light guide plate in the backlight module according to claim 8.

12. The light guide plate according to claim 11, wherein in a direction perpendicular to the light incident surface, the light-converging cavity includes a first surface and a second surface that are opposite to each other; the first surface is a convex curved surface, and the second surface is a flat surface, a convex curved surface or a concave curved surface.

13. The light guide plate according to claim 12, wherein in a case where the second surface is a concave curved surface, a degree of convexity of the convex curved surface is greater than a degree of concavity of the concave curved surface.

* * * * *